United States Patent
Timson (10) Patent No.: US 12,557,152 B2
(45) Date of Patent: Feb. 17, 2026

(54) ESTABLISHING A WIRELESS CONNECTION WITH A MOBILE DEVICE

(71) Applicant: CellXion Ltd, London (GB)

(72) Inventor: Anthony Timson, London (GB)

(73) Assignee: CellXion Ltd, London (GB)

( * ) Notice: Subject to any disclaimer, the term of this patent is extended or adjusted under 35 U.S.C. 154(b) by 346 days.

(21) Appl. No.: 18/322,443

(22) Filed: May 23, 2023

(65) Prior Publication Data

US 2023/0300909 A1 Sep. 21, 2023

Related U.S. Application Data

(63) Continuation of application No. PCT/EP2021/083037, filed on Nov. 25, 2021.

(30) Foreign Application Priority Data

Nov. 25, 2020 (GB) .................................. 2018566

(51) Int. Cl.
| | |
|---|---|
| *H04W 36/08* | (2009.01) |
| *H04W 36/00* | (2009.01) |
| *H04W 76/10* | (2018.01) |
| *H04W 36/04* | (2009.01) |

(52) U.S. Cl.
CPC ....... *H04W 76/10* (2018.02); *H04W 36/0085* (2018.08); *H04W 36/08* (2013.01)

(58) Field of Classification Search
CPC ............................... H04L 12/28; H04L 12/50
USPC ................... 370/329, 401, 402, 403
See application file for complete search history.

(56) References Cited

U.S. PATENT DOCUMENTS

| | | | |
|---|---|---|---|
| 6,832,093 | B1 | 12/2004 | Ranta |
| 12,192,873 | B2* | 1/2025 | Hwang ............... H04W 76/38 |
| 2002/0102968 | A1 | 8/2002 | Arend et al. |
| 2009/0215386 | A1 | 8/2009 | Dobrosavljevic et al. |
| 2009/0311963 | A1 | 12/2009 | Haverty |
| 2010/0166180 | A1 | 7/2010 | Steer et al. |
| 2011/0086590 | A1 | 4/2011 | Johnson et al. |

FOREIGN PATENT DOCUMENTS

EP 2786616 A1 10/2014

OTHER PUBLICATIONS

Lichtman Marc et al: "Vulnerability of LTE to hostile interface" 2013 IEEE Global Conference on Signal and Information Processing, Dec. 3, 2013, pp. 285-288, XP032566692.

(Continued)

*Primary Examiner* — Dang T Ton
(74) *Attorney, Agent, or Firm* — EIP US LLP (57) ABSTRACT

Apparatus for establishing a wireless connection with a mobile communication device includes a transceiver arranged to transmit a set of broadcast control signals on a first carrier, thereby to enable the establishing of the wireless connection between the transceiver and the mobile communication device. The apparatus further includes one or more transmitters each arranged to transmit a respective interference signal for interfering with broadcast control signals transmitted on a respective one or more carriers different from the first carrier by a respective one or more base stations of a mobile communications network.

18 Claims, 5 Drawing Sheets

(56) References Cited

OTHER PUBLICATIONS

Labib Mina et al: "Enhancing the Robustness of LTE Systems: Analysis and Evolution of the Cell Selection Process" IEEE Communications Magazine, vol. 55, No. 2, Feb. 1, 2017, pp. 208-215, XP011640293.
International Search Report and Written Opinion dated Mar. 29, 2022 for PCT Application No. PCT/EP2021/083037.
Combined Search and Examination Report dated Apr. 16, 2021 for GB Application No. GB2018566.6.

\* cited by examiner

= PRB containing PSS, SSS, PBCH

= PRB containing PSS, SSS

= PRB containing interference signal

ESTABLISHING A WIRELESS CONNECTION WITH A MOBILE DEVICE

CROSS-REFERENCE TO RELATED APPLICATIONS

This application is a continuation under 35 U.S.C. § 120 of International Application No. PCT/EP2021/083037, filed Nov. 25, 2021, which claims priority to GB Application No. GB2018566.6, filed Nov. 25, 2020, under 35 U.S.C. § 119(a). Each of the above-referenced patent applications is incorporated by reference in its entirety.

BACKGROUND

Technical Field

The present invention relates to the establishing of a wireless connection between a base station apparatus and a mobile communications device in accordance with a mobile communications standard. The invention has particular, but not exclusive, relevance to the establishing of a wireless connection between a base station apparatus and a mobile communications device in accordance with the LTE or LTE-A mobile communication standard.

Background

According to various mobile communications standards, including long-term evolution (LTE) and long-term evolution advanced (LTE-A), a user equipment (UE) camping on a serving cell of a cellular network is required to regularly measure signal characteristics of downlink signals transmitted by base stations of the network. These measurements are used by the UE to decide, on the basis of a set of cell selection criteria or reselection criteria, whether or not a UE should camp on a given cell.

Under certain circumstances, it is desired to force a UE to camp on a specific cell. For example, a dedicated base station may be deployed in association with a sports or entertainment event and it may be desired that attendees camp on that dedicated base station rather than the existing base stations in the vicinity. In another example, a dedicated base station may be deployed in or around an airport, stadium or other facility to provide limited or modified services, or to prevent access to the mobile communications network altogether, from within the facility. A system for providing such services may be referred to as a Managed Access System (MAS).

Different public mobile land networks (PLMNs) typically use different sets of frequency bands, and a given provider may associate different priorities to different frequency bands within a given set of frequency bands. Therefore, in order to ensure that all UEs in a given vicinity are captured by the dedicated base station, transceivers would need to be provided to operate in all relevant frequency bands. In examples in which sector splitting and/or distributed antenna systems (DASs) are employed, multiple dedicated transceivers may be required for each frequency band. The resulting configuration of base station transceivers can be costly, and deployment of such a configuration of base station transceivers can be inconvenient and/or challenging in certain environments, for example urban environments.

In order to cause a UE to perform cell reselection to a specific target cell, it is necessary for the corresponding signal characteristics measured by the UE to satisfy the cell reselection criteria. This can usually be achieved by transmitting a sufficiently powerful downlink signal in the target cell within an appropriate frequency band. However, if a UE measures a sufficiently high signal strength and/or signal quality for the serving cell on which the UE is currently camping, the UE may be permitted to enter a power-saving "perfect cell" mode, in which the UE only monitors the signal characteristics for the serving cell and no longer measures signal characteristics for the neighbouring cells. As a result, no reselection will be performed, irrespective of the power of the downlink signal transmitted by the base station of the target cell.

SUMMARY

According to a first aspect of the present invention, there is provided apparatus for establishing a wireless connection with a mobile communication device. The apparatus includes a transceiver arranged to transmit a set of broadcast control signals on a first carrier, thereby to enable the establishing of the wireless connection between the transceiver and the mobile communication device. The apparatus further includes one or more transmitters each arranged to transmit a respective interference signal for interfering with broadcast control signals transmitted on a respective one or more carriers different from the first carrier by a respective one or more base stations of a mobile communications network.

The one or more transmitters may be relatively inexpensive downlink-only devices. By strategically allocating transceivers to only a necessary subset of the carriers, and providing transmitters to interfere with broadcast control signals transmitted on any other carrier on which the base stations of the network operate, a simplified configuration of antenna can be used to implement a Managed Access System (MAS).

In examples, the transceiver is arranged to transmit a further interference signal on the first carrier for interfering with broadcast control signals transmitted on the first carrier by a further base station of the mobile communications network. This can help to facilitate cell reselection for mobile communication devices camping on a cell on the carrier. In particular, transmitting the further interference signal prevents a situation where the mobile communications device enters a "perfect cell" mode with regard to intra-frequency cells, in which the mobile communications device may otherwise be permitted to refrain from measuring the broadcast control signals transmitted by the transceiver. For example, the downlink signal may include data encoded and modulated using orthogonal frequency-division multiplexing (OFDM) and allocated to a first set of resource blocks on the first carrier, and the further interference signal may include data encoded and modulated using OFDM and allocated to a second set of resource blocks occupying at least a portion of the bandwidth of the first carrier. The at least portion of the bandwidth includes a control region in which the further base station of the mobile communications network transmits broadcast control signals and the second set of resource blocks is disjoint from the first set of resource blocks.

According to a second aspect of the present invention, there is provided a method of establishing a wireless connection between a transceiver and a mobile communication device. The method includes transmitting, by a transceiver, a set of broadcast control signals on a first carrier, thereby to enable the establishing of the wireless connection between the transceiver and the mobile communication device. The method further includes transmitting, by each of one or more transmitters, a respective interference signal on a respective one or more carriers different from the first carrier for interfering with broadcast control signals transmitted by a respective one or more base stations of a mobile communications network.

Further features and advantages of the invention will become apparent from the following description of preferred embodiments of the invention, given by way of example only, which is made with reference to the accompanying drawings.

DETAILED DESCRIPTION

Figure 1:
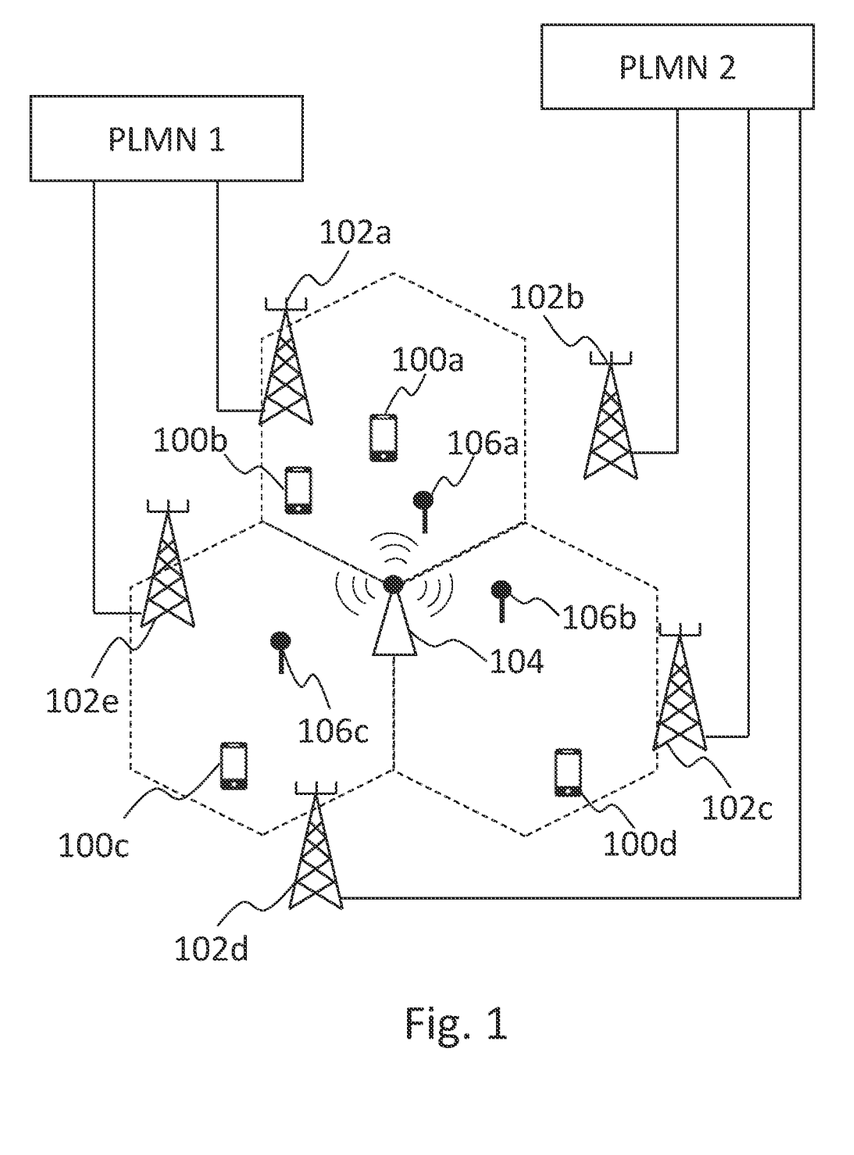
FIG. 1 shows an example of apparatus for establishing a wireless connection with mobile communication devices in a target area.

FIG. 1 shows an example in which each of a set of user equipments (UEs) 100a-d is arranged to communicate with one of two public mobile land networks (PLMNs), referred to as PLMN 1 and PLMN2, in accordance with the long-term evolution (LTE) standard. The UEs in this example are smartphones, which are mobile phones. In other examples, a UE may instead be a laptop computer, a tablet, or any other device arranged to communicate with a PLMN in accordance with a mobile communications standard. Each of the PLMNs is operated by a respective service provider, and each PLMN may have capabilities to communicate with UEs using a variety of radio access technologies (RATs), including for example LTE, Global System for Mobile Communications (GSM), Universal Mobile Telecommunications System (UMTS), and/or 5G New Radio (NR). Each PLMN is allocated a distinct set of frequency bands for each available RAT and may operate one or more carriers within each of those frequency bands. A carrier is a set of radio resources capable of conveying a signal in accordance with a given RAT. In the example of LTE, a frequency band may include multiple carriers having different centre frequencies and possibly different bandwidths, and each including multiple subcarriers.

Each of a set of LTE base stations (referred to as an Evolved Node B, eNodeBs or eNB 102) is associated with one of the PLMNs and is connected to other components of the PLMN including a Mobility Management Entity (MME), a Packet Data Network Gateway (P-GW) and a Serving Gateway (S-GW) of an Evolved Packet Core (EPC) network (not shown). Each of the eNodeBs 102a-e is further able to communicate with another eNodeBs over an X2 interface for scheduling and other purposes. In the present example each of the eNodeB s 102a-e includes three directional antennae for communicating with UEs in three respective angular sectors. In other examples, a base station may be associated with more or fewer than three sectors.

In the example of FIG. 1, base station apparatus 104 is deployed independently of any PLMN and is used to restrict access to the PLMNs in the vicinity of the base station apparatus 104. The base station apparatus 104 is located in the vicinity of a target area, which in this example is a stadium for sporting events (not shown), and it is desirable that any UE within the stadium camps on a cell corresponding to the base station apparatus 104, as opposed to a cell of any of any PLMN. The cell corresponding to the base station apparatus 104 is thus referred to as a target cell. The base station apparatus 104 is part of a managed access system (MAS), which in this example is predominantly a signalling network arranged such that UEs in the stadium camp on the cell generated by the base station apparatus 104, but providing no further services such as allowing UEs to page or make calls. In other examples, a base station apparatus may be part of an MAS arranged to provide UEs with limited or modified services in a target area, or a base station apparatus may be connected to a PLMN and arranged to provide UEs with some or all of the services provided by a standard eNodeB of the PLMN. In some examples, a base station apparatus may be arranged to permit access to services of a PLMN for certain UEs, identified for example by the international mobile subscriber identity (IMSI) associated with the UEs appearing on an "allowed" list, but restricted for UEs whose IMSI does not appear on the "allowed" list.

The base station apparatus 104 in the present example includes multiple transceivers each configured for communicating with UEs on a respective LTE carrier. In this example, the base station apparatus 104 includes multiple sets of three transceivers, where the transceivers in each set are identical except having a different primary scrambling codes (PSCs) and physical cell identities (PCIs). Each transceiver in each set includes a directional antenna oriented for communication with UEs in a respective one of three sectors, represented schematically as dashed hexagons in FIG. 1. Although in this example the base station apparatus 104 is shown as single entity, in other examples transceivers may be positioned separately from one another within the vicinity of the target area. For example, the transceivers may be arranged as one or more DASs. The base station apparatus 104 in this example further has the same capabilities as an LTE-compliant UE to measure signal characteristics and perform various other functions in relation to the eNodeBs 102.

As mentioned above, it is desirable that any UE powered up in the target area, or entering the target area, camps on the target cell generated by the base station apparatus 104, rather than any of the neighbouring cells generated by the eNodeBs 102. As mentioned above, in the present example each of the eNodeBs 102a-e operates on a different carrier to the other eNodeBs 102a-e, and the eNodeBs 102a, 102e are associated with a different PLMN to the eNodeBs 102b, 102c, 102d. Each UE will typically only be registered with one of the PLMNs, and will prioritise certain frequency bands above others, as will be explained in more detail hereafter. Furthermore, UEs will tend to avoid switching between frequency bands where possible. Assuming that the five eNodeBs 102a-e are the only eNodeBs with coverage extending into the target area, the above considerations mean that, in order to naively implement a MAS with three-directional sector splitting as shown in FIG. 1, the base station apparatus 104 would need to include 5×3=15 transceivers each having associated radio equipment for decoding/demodulating and modulating/demodulating signals. In reality, the number can be far higher than this, as a greater number of carriers and frequency bands may be in use within a given target area. The resulting configuration of transceivers and associated radio equipment may be expensive and, in some cases, inconvenient or impossible from a deployment point of view. In cases where transceivers are arranged to form a DAS, the configuration of transceivers can be even more complex.

In accordance with the present disclosure, the above issues are mitigated by further providing a set of transmitters 106a-c. In this example, each of the transmitters 106a-c is implemented as a downlink-only software-defined radio (SDR). Due to the transmitters 106a-c being simplex devices, the cost of each of the transmitters 106a-c is relatively low compared with the cost of each transceiver and associated radio equipment in the base station apparatus 104. The transmitters 106a-c need not be networked or connected in any way to the base station apparatus 104 (though this is also possible). Although the transmitters 106a-c are shown in FIG. 1 as being remote from the base station apparatus 104, the transmitters 106a-c may alternatively be located close to, or may be integral to, the base station apparatus 104. Because the transmitters 106a-c are downlink-only SDRs, each transmitter may include a single omni-directional antenna, as opposed to several directional antennae as required to implement sector splitting for a two-way transceiver.

Each of the transmitters 106a-c is arranged to transmit an interference signal on a respective carrier on which one of the eNodeBs operates. In this example, the transmitter 106a is arranged to transmit an interference signal on the carrier corresponding to the eNodeB 102a, the transmitter 106b is arranged to transmit an interference signal on the carrier corresponding to the eNodeB 102b, and the transmitter 106c is arranged to transmit an interference signal on the carrier corresponding to the eNodeB 102c. The interference signal transmitted on a given carrier is arranged to interfere with broadcast control signals transmitted on that carrier by one of the eNodeBs 102. Specific examples of interference signals will be described in more detail hereafter.

In the present example, the transmitters 106a-c are arranged to interfere with broadcast control signals transmitted by the eNodeBs 102a-c. The transmitters 106a-c do not interfere with broadcast control signals transmitter by the remaining eNodeBs 102d, 102e. Instead, transceivers of the base station apparatus 104 are arranged to operate on the same carriers as the eNodeB s 102d, 102e. As will be explained in detail hereafter, this is a sufficient number of transmitters 106 and transceivers of the base station apparatus 104 to implement the MAS in accordance with the present disclosure. Assuming three-directional sector splitting, three transceivers are provided for each of the carriers on which the eNodeBs 102d, 102e operate, resulting in a total of six transceivers in addition to the three transmitters 106a-c. The resulting configuration is simpler to implement, and less expensive, than the 15-antenna configuration discussed above.

In order for the base station apparatus 104 to be effective in regard to all UEs 100 in the target area, the base station apparatus 104 is arranged to operate on at least one carrier in a frequency band allocated to each PLMN with coverage in the target area. In the present example, the minimum number of carriers on which the base station apparatus 104 must operate is therefore two, corresponding to the two PLMNs with coverage in the area. Some UEs 100 (for example, older UEs which operate using legacy RATs such as 2G and 3G) are only required to be compatible with a certain subset of the frequency bands which have now been allocated. Newer UEs 100 are also required to be compatible with frequency bands in this subset, and may also be compatible with additional frequency bands. As a result of these requirements, it is only necessary for the base station apparatus 104 to operate within frequency bands that are both present in the target area, and also belong to the subset of frequency bands mentioned above (at the time of writing this subset includes the 900 MHz, 1800 MHz and 2100 MHz LTE carriers). In the example of FIG. 1, the eNodeBs 102d, 102e respectively operate on carriers in the 900 MHz and 1800 MHz frequency bands, and the base station apparatus 104 therefore includes transceivers arranged to operate on carriers in each of these frequency bands. By scanning for broadcast control signals across all relevant frequency bands in a given target area (for example using the UE capabilities of the base station apparatus 104), minimum requirements can be determined for a configuration of transmitters and transceivers for implementing an MAS within the target area.

In order for the MAS to be implemented successfully using the base station apparatus 104, the base station apparatus 104 must be able to capture UEs 100 which power up in the target area, as well as UEs 100 which move into the target area whilst already switched on. The configuration of transmitters 106 and transceivers of the base station apparatus 104 is the minimum required to ensure that this will be the case, as will be explained hereafter.

When a UE 100 is powered up, the UE 100 will perform a cell selection process in which the UE 100 first scans all relevant frequency bands (i.e. frequency bands with which the UE is compatible, and which are allocated to the PLMN to which the UE 100 is registered), then selects a cell that satisfies the cell selection criteria specified in 3GPP TS 36.304 section 5.2.3.2. Depending on whether the UE 100 performs "initial cell selection" or "stored information cell selection" (see 3GPP TS 36.304 section 5.2.3.1), the UE 100 may by default select the strongest detected cell, or may alternatively select a cell from a list of candidate detected cell in dependence on information stored by the UE 100. The strength of a cell for this purpose is quantified using Srxlev, which is derived from reference signal received power (RSRP) values of downlink signals in accordance with various parameters as described in 3GPP TS 36.304 section 5.2.3.2.

The interference signals transmitted by the transmitters 106 are arranged to ensure that the cell selection criteria will not be satisfied for any UE in the target area, except by the cells generated by the base station apparatus 104 and the cells corresponding to the eNodeBs 102d, 102e operating on the same carriers as the base station apparatus 104. Provided that the UE measures the cell generated by the base station apparatus 104 to be stronger than the cell corresponding to the eNodeB 102d, 102e operating on the same carrier, the UE will preferentially camp on the cell generated by the base station 104.

When a UE enters the vicinity of the target area whilst already switched on, the UE will perform a cell reselection to a target cell generated by the base station 104, provided that cell reselection criteria are satisfied as specified in 3GPP TS 36.304 sections 5.2.4.5 and 5.2.4.6. The specific cell resection criteria which apply depend on whether the frequency band and radio access technology (RAT) of the target cell is the same as the frequency band and RAT of the currently serving cell, and if not, whether the frequency band and RAT of the target cell has a higher, lower, or equal reselection priority compared with the frequency band and RAT of the currently serving cell. In any case, a UE 100 can only perform a cell reselection if the UE 100 measures a reference signal received power (RSRP) of the target cell to be greater than a certain threshold value (which can be derived from system information transmitted by the serving cell, and may depend on the RSRP of the serving cell). The interference signals transmitted by the transmitters 106 and the downlink signals transmitted by the base station apparatus 104 are arranged to ensure that the cell reselection criteria are satisfied in respect of the base station apparatus 104 for UEs camping on a cell corresponding to any of the eNodeBs 102a-e. This is possible due to the configuration of transmitters 106 and transceivers described above.

Figure 2:
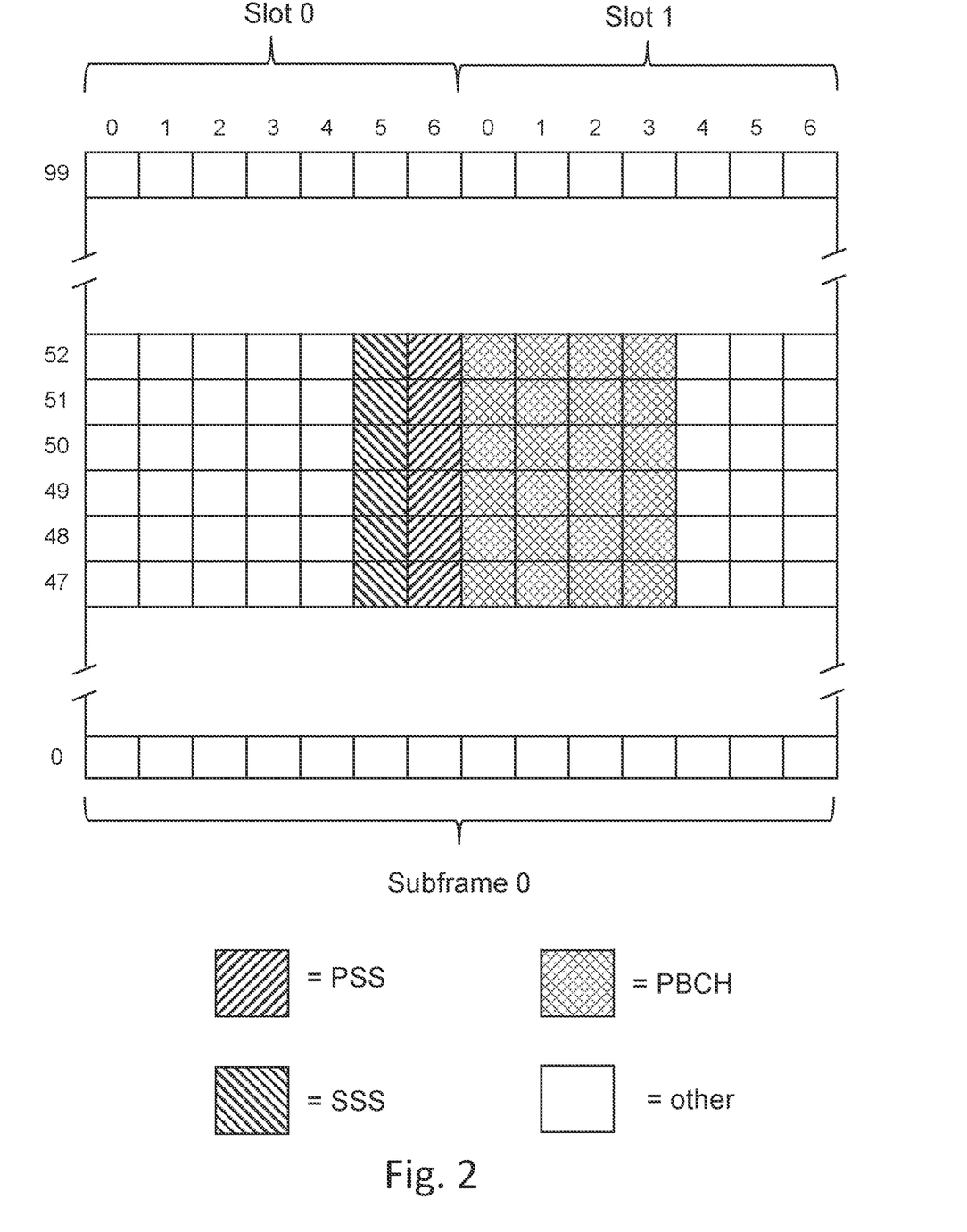
FIG. 2 is a resource grid showing a configuration of broadcast control signals according to the long-term evolution (LTE) standard.
Figure 3:
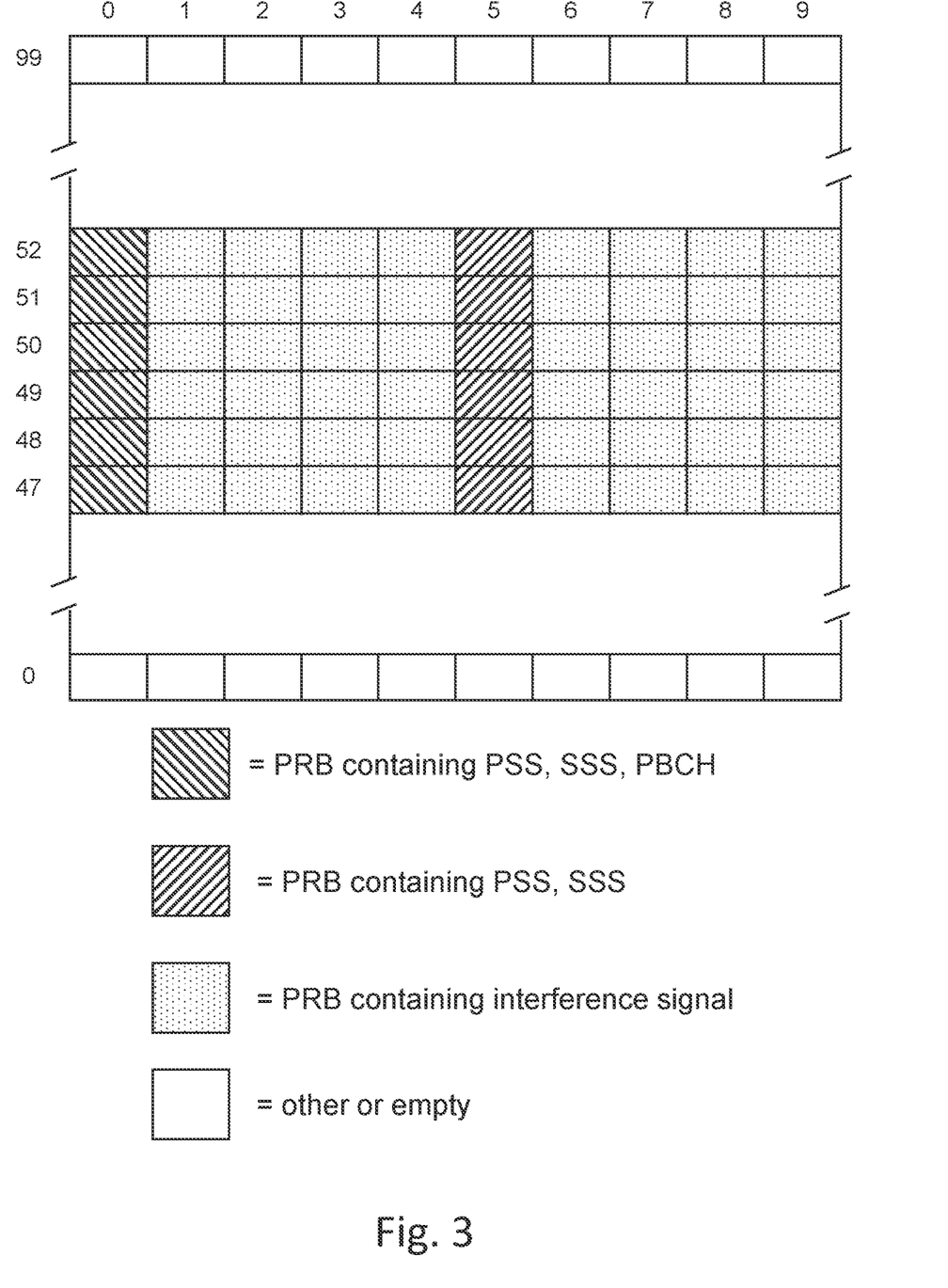
FIG. 3 shows a configuration of signals transmitted by a base station apparatus in accordance with examples.
Figure 4:
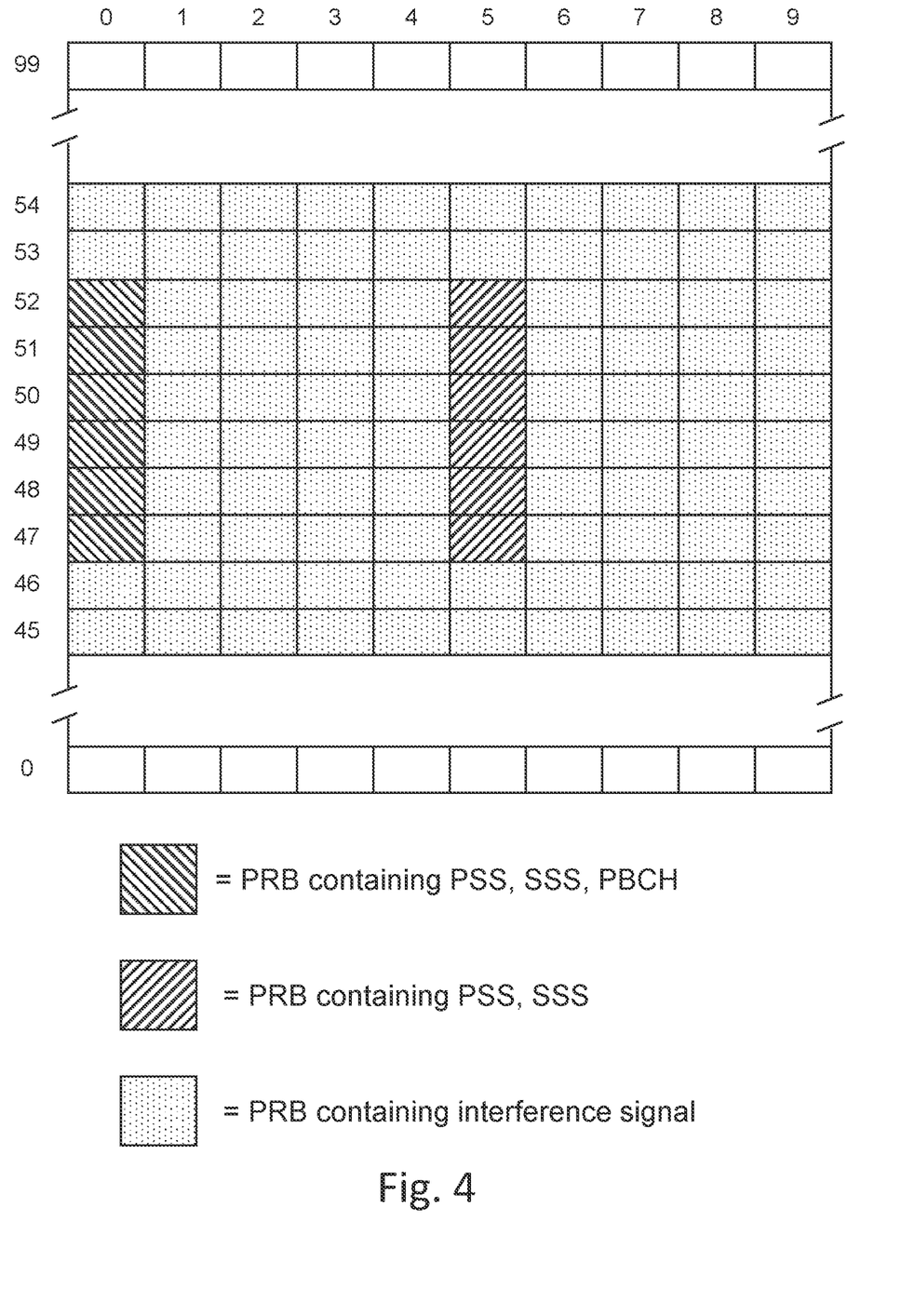
FIG. 4 shows a further configuration of signals transmitted by a base station apparatus in accordance with examples.
Figure 5:
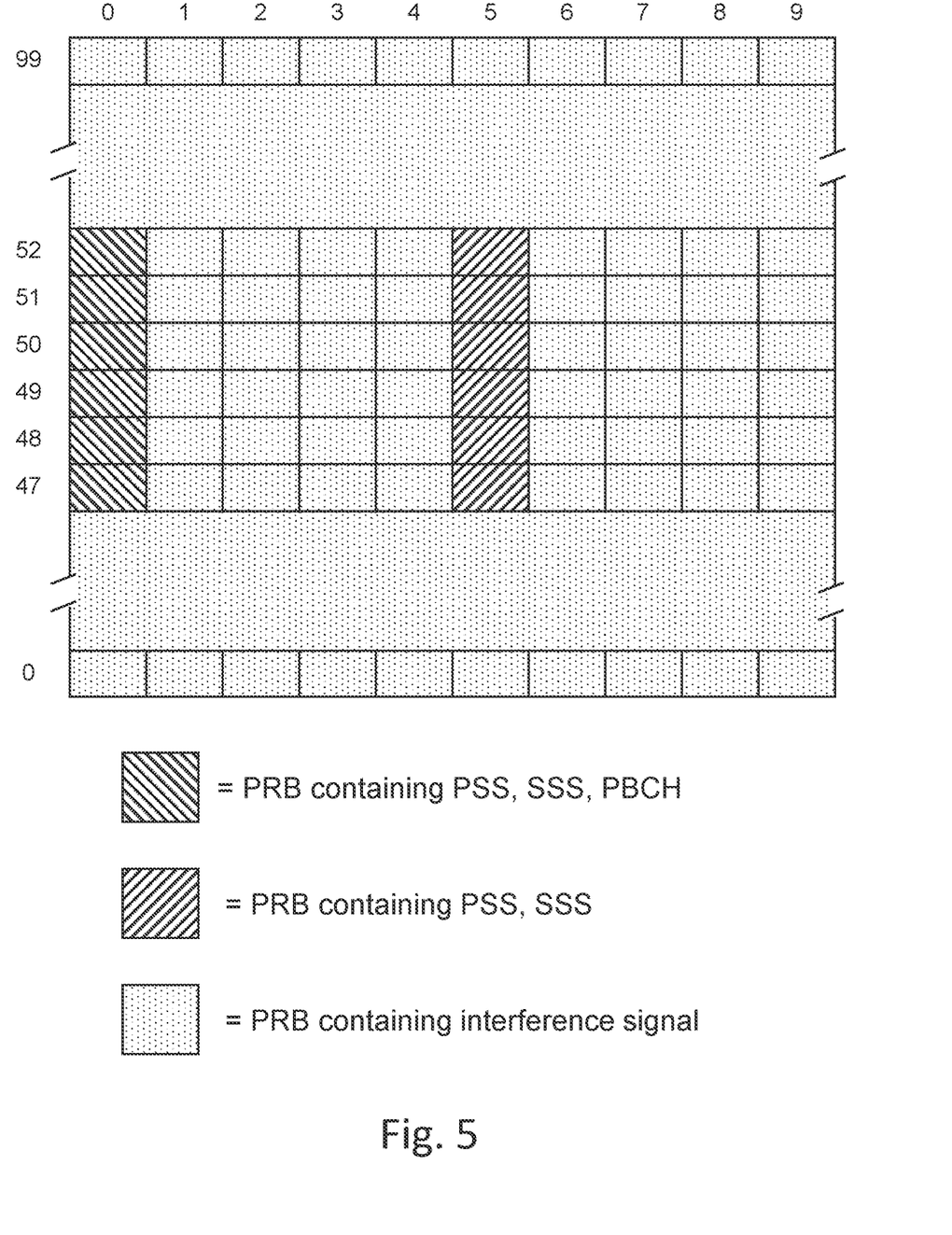
FIG. 5 shows a still further configuration of signals transmitted by a base station apparatus in accordance with examples.

As mentioned above, the transmitters 106a-c transmit interference signals for interfering with broadcast control signals transmitted by the eNodeBs 102. In accordance with the LTE specification, the base station apparatus 104 allocates PRBs in which to transmit a set of broadcast control signals. The broadcast control signals are allocated in a predetermined configuration in subframes 0 and 5 of each system frame, within a central control region of the carrier. The broadcast control signals include a primary synchronisation (PSS), a secondary synchronisation signal (SSS), and a physical broadcast channel (PBCH). FIG. 2 shows a resource map including the central control region for subframe 0 of a system frame in 20 MHz LTE. The subcarriers are indexed in groups of 12 (the number of subcarriers in a physical resource block (PRB)) from 0 to 99. A PRB in LTE includes 6 OFDM symbols (one "slot" or half a subframe) transmitted on 12 subcarriers, and is the minimum time-frequency unit that can be allocated to user plane data for a single user. The control region, in which the PSS, SSS and PBCH are transmitted, contains 72 subcarriers occupying subcarrier groups 47 to 52. The control region occupies different subcarrier groups for different LTE bandwidths, but is generally located centrally within the carrier bandwidth. FIGS. 3 to 5 shows PRBs containing the broadcast control signals within a system frame for 20 MHz LTE.

A first example of an interference signal for interfering with broadcast control signals transmitted by one of the eNodeBs 102 on a given carrier is a continuous wave (CW) signal with a frequency within the carrier bandwidth. Preferably, the CW signal has a frequency within a central control region of the carrier in which the eNodeB 102 transmits broadcast control signals. The energy carried by the CW signal is highly concentrated at a single frequency or within a very narrow frequency range. It has been found that such a signal can force the automatic gain control (AGC) circuitry of a UE to attenuate the amplitude of downlink signals on the carrier to a sufficient degree that the UE is no longer able to distinguish broadcast control signals from noise, or at least so that the received power of the broadcast control signals falls below a detection threshold.

A second example of an interference signal for interfering with broadcast control signals transmitted on a given carrier is a signal modulated with Gaussian Minimum Shift Keying (GMSK) centred within the control region of the carrier. A third example of an interference signal is frequency-limited noise such as additive Gaussian white noise (AGWN) centred within the control region of the carrier.

A fourth example of an interference signal is a set of data encoded and modulated using orthogonal frequency-division multiplexing and allocated to resource blocks occupying at least a portion of the carrier bandwidth. The data may be random or pseudo-random data, for example. The resource blocks occupy a portion of the carrier corresponding to the control region, and may extend to frequencies above and/or below the control region. By allowing the interference signal to extend into frequencies band above and/or below the control region, the interference signal becomes more effective at forcing a UE to perform a cell reselection when camping on one of the eNodeBs 102, because the cell reselection criteria depend on measurements of reference signals which are evenly distributed throughout the carrier. The greater the range of frequencies over which such an interference signal is transmitted, the more effective the interference signal will be at forcing cell reselection to a cell generated by the base station apparatus 104. However, selectively transmitting the interference signal in a narrow portion of the carrier containing the control region therefore provides an efficient means of degrading the downlink signals transmitted by the eNodeB s 102, for example when it is not feasible to transmit the interference signal throughout the entire carrier due to power limitations of the transmitter 106.

It is clear from the above discussion of cell reselection that a UE will only perform a cell reselection if the UE actively measures signal characteristics of signals transmitted within candidate cells for reselection. However, 3GPP TS 36.304 section 5.2.4.2 permits a UE to forego inter-frequency and/or intra-frequency measurements of candidate cells if the following respective measurement criteria are satisfied:

1. for intra-frequency candidate cells, the Srxlev value for the serving cell is greater than or equal to a threshold value $S_{intrasearch}$, if such a value is specified in system information transmitted by the serving base station; and
2. for inter-frequency and/or inter-RAT candidate cells, the reselection priority of the candidate cell is equal or lower than the reselection priority of the serving cell and the Srxlev value for the serving cell is greater than or equal to a threshold value $S_{nonintrasearch}$, if such a value is specified in system information transmitted by the serving base station, where Srxlev is derived from RSRP values of downlink signals in accordance with various parameters as described in 3GPP TS 36.304 section 5.2.3.2. When a UE determines that the relevant one of the above criteria to be satisfied, the serving cell is referred to as a "perfect cell" with respect to intra-frequency, inter-frequency, and/or inter-RAT cell reselections. In the example of FIG. 1, this may prevent a UE 100 which is camping on a cell corresponding to one of the eNodeB s 102a-e from measuring a downlink signal transmitted by the base station apparatus 104, and therefore from performing a cell reselection to a cell generated by the base station apparatus 104. Although perfect cell mode is not a requirement of the LTE specification (a UE 100 is permitted to keep making measurements even when criteria 1 and 2 are satisfied), it is expected that UE manufacturers will make use of this possibility for energy saving reasons.

In order to prevent a UE 100 from subsequently reselecting a different cell whilst still in the coverage area of the base station apparatus 104, the base station apparatus 104 can specify values of various parameters which makes such a reselection unlikely or impossible. For example, the base station apparatus 104 can set very low values for the thresholds $S_{intrasearch}$ and/or $S_{nonintrasearch}$, such that UEs camping on the base station apparatus 104 are permitted to stop measuring neighbouring cells, even when the Srxlev measured for the base station apparatus 104 is relatively low.

In the example of FIG. 1, the base station apparatus 104 operates in different frequency bands to the eNodeBs 102a-c, so the cells generated by the base station apparatus 104 are inter-frequency cells with respect to the eNodeBs 102a-c. A UE 100 camping on one of the eNodeBs 102a-c may therefore be permitted to refrain from measuring the downlink signals transmitted by the base station apparatus 104, if the depending on the reselection priorities of the cells, in which case no cell reselection to a cell generated the base station apparatus 104 will be possible.

A UE camping on a serving cell will regularly check the broadcast control signals of the serving cell, to determine whether there have been any changes to characteristics of the serving cell. The inventor has discovered that transmitting an interference signal to interfere with the broadcast control signals can cause the UE to exit perfect cell mode, irrespective of the strength and quality of the reference signals transmitted in other regions of the carrier bandwidth. A suitable interference signal for this purpose is a set of OFDM data allocated to resource blocks occupying at least a portion of the carrier containing the control region.

The base station apparatus 104 operates in the same frequency bands and uses the same RATs as the eNodeBs 102d, 102e, so the cells generated by the base station apparatus 104 are intra-frequency cells with respect to the eNodeBs 102d, 102e. For example, assuming that the eNodeB 102d transmits a value for $S_{intrasearch}$, then a UE 100 camping on a cell corresponding to the eNodeB 102d is permitted to enter a perfect cell mode with respect to intra-frequency cells, in which case the UE 100 will refrain from measuring intra-frequency cells if the signal strength received from the eNodeB 102d is sufficiently high, and accordingly no cell reselection to a cell generated the base station apparatus 104 will be possible.

In accordance with an aspect of the invention, the base station apparatus 104 may be arranged to take additional measures to avoid a situation where a UE 100 camping on one of the intra-frequency cells 102d, 102e does not perform a cell reselection to a cell generated by the base station apparatus 104. For each of the carriers on which the base station 104 is to operate, the base station apparatus 104 allocates a first set of PRBs in which to transmit data via a downlink signal within a given frequency band. The allocated PRBs include PRBs for transmitting control plane data and optionally PRBs for transmitting user plane data, depending on the specific application of the base station apparatus 104.

In the present example, the subframe timing of the base station apparatus 104 and the allocation of the first set of PRBs for each downlink signal is performed independently of signals transmitted by any of the eNodeBs 102. In other examples, the subframe timing can be made dependent on signals transmitted by neighbouring cells, as will be explained in more detail hereafter. Furthermore, in some examples the first set of PRBs may be allocated/scheduled in dependence on signals exchanged with the eNodeBs 102 in the vicinity of the base station apparatus 104, for example using the X2 interface.

For each of the carriers on which the base station apparatus 104 is arranged to operate, the base station apparatus 104 transmits a downlink signal in the allocated first set of PRBs. The downlink signal includes control plane data and, optionally, user plane data, where the control plane data includes a set of broadcast control signals to facilitate the establishing of a wireless connection with a UE 100. For each frequency band in which the base station apparatus 104 is arranged to operate, the base station apparatus 104 further transmits an interference signal for interfering with broadcast control signals transmitted by the eNodeBs 102d, 102e operating on the same carrier. The interference signal is transmitted in a second set of PRBs which is different from the first set of PRBs to which the downlink signal is allocated. In the present example, the second set of PRBs is disjoint from the first set of PRBs. In other words, the interference signal is not transmitted in the PRBs allocated to the downlink signal of the target cell, so the interference signal does not interfere with PRBs carrying the downlink signal of the target cell. In other examples, the interference signal may share certain PRBs with the downlink signal of the target cell. For example, the interference signal may further be transmitted in the PRBs containing the PSS, SSS and PBCH, but in resource elements that are not occupied by the PSS, SSS and PBCH.

FIG. 3 shows an example configuration of PRBs transmitted by the base station apparatus 104. In this example, an interference signal is contained entirely within the central control region of the carrier in which the broadcast control signals are transmitted. The interference signal is transmitted in all PRBs in the control region not used by the base station apparatus 104, which in this example includes only the PRBs containing the broadcast control signals.

In some examples, the interference signal can be configured to extend into regions of the carrier bandwidth in which the broadcast reference signals are not transmitted. In this way, the interference signal can effectively degrade measurements by the UEs 100 of reference signals transmitted by the eNodeBs 102d, 102e. In LTE, measurements of RSRP and RSRQ, on which the cell reselection criteria are based, are performed using a cell-specific reference signal (CRS) which is transmitted throughout the carrier bandwidth. An effective way to degrade measurements of a given downlink signal is therefore to transmit the interference signal in resource elements containing the CRS of the given downlink signal. Transmitting the interference signal over a wider frequency range will typically result in more effective degrading of measurements of downlink signals by mobile communications devices, as the interference signal will occupy more resource elements occupied by the CRS of the downlink signals. Increasing the bandwidth and/or the power of the interference signal generally increases the size of the region in which the base station apparatus 104 can force a cell reselection from a candidate perfect cell to the target cell, and furthermore causes cell reselections to occur more quickly.

In order for the above method to be effective at degrading measurements of the cell corresponding to a given eNodeB 102 without also degrading measurements of the cell generated by the base station apparatus 104, it is advantageous for the CRS transmitted by the base station apparatus 104 to occupy different resource elements to the CRS of the cell corresponding to a given eNodeB 102. A CRS configuration for a given eNodeB 102 can be determined by decoding the PSS, SSS and PBCH of the downlink signal transmitted by the eNodeB 102, which include sufficient information to determine the physical cell ID, system frame number, and system bandwidth associated with the downlink signal. These parameters are sufficient for determining the CRS configuration (in accordance with 3GPP TS 36.211 section 6.10.1). The base station apparatus 104 can then ensure a different CRS configuration to that of the eNodeB 102 by selecting a physical cell ID that differs from the physical cell ID of the eNodeB 102 by a predetermined amount. This results in the CRS occupying resource elements on different subcarriers.

FIG. 4 shows a further example in which an interference signal occupies a wider region of the carrier bandwidth that includes the control region and also includes several subcarriers at frequencies either side of the control region. FIG. 5 shows a still further example in which an interference signal is transmitted throughout the entire the carrier bandwidth. This is the most aggressive interference strategy, and will degrade measurements of as many cells as possible, other than the target cell, as effectively as possible. However, this method requires the transceiver of the base station apparatus 104 to operate at 100% duty cycle throughout the carrier bandwidth, and as a result requires the amplifier of the base station apparatus 104 to operate at a very high power.

Since the base station apparatus 104 must transmit its own downlink signal within the same frequency band as the interference signal, the interference signal should be configured to avoid PRBs needed for the downlink signal of the base station apparatus 104, PRBs allocated for the purposes of dedicated signalling with UEs communicating with the base station apparatus 104, and resource elements occupied by the CRS transmitted by the base station apparatus 104. The base station apparatus 104 may, for example, transmit the interference signal in every resource element of every PRB within a given frequency range, except for:

PRBs needed for the downlink signal of the base station apparatus 104;
PRBs allocated for the purposes of dedicated signalling with UEs communicating with base station apparatus 104; and
resource elements used for the CRS of the base station apparatus 104.

Since the allocation of PRBs by the base station apparatus 104 can change over time, the configuration of the interference signal may need to be updated dynamically to avoid the PRBs mentioned above.

In the example of FIG. 1, the base station apparatus 104 does not enable access to either of the PLMNs to which the eNodeBs 102a-e enable access. Depending on the specific application, the base station apparatus 104 may enable access to a different PLMN, or may not be connected to any PLMN at all. In other examples, a separately introduced base station may be used to enable access to the same PLMN as surrounding base stations. In further examples, it may be desirable for a network operator to ensure that UEs perform reselection to a target cell when in the vicinity of the corresponding eNodeB. The MME of the eNodeB in question may be modified to enable controlled access to the network for UEs in the target cell, for example in dependence on a location of the UE in the cell, as described in patent publication WO 2018/046958.

Whilst the methods above have been described in the context of cell reselection for UEs in idle mode, the same methods can also be used to trigger events as defined in 3GPP TS 36.331 for a UE in connected mode, facilitating handover to a target cell.

Various aspects of the methods described above may be performed using processing circuitry in the form of any suitable form or forms of processing unit, for example a central processing unit (CPU), an application-specific integrated circuit (ASIC), and/or a digital signal processor (DSP). The method is generally implemented through the execution of machine-readable code stored on a non-transient storage medium at the base station apparatus 104 and the transmitters 106.

The above embodiments are to be understood as illustrative examples of the invention. Further embodiments of the invention are envisaged. In some cases, downlink-only transmitters such as those described above may be arranged to transmit a signal specifically configured to induce a UE to perform a cell reselection to a base station apparatus. For example, in the system of FIG. 1, one or more of the transmitters 106 may transmit broadcast control signals and system information messages suitable for inducing a UE 100 to perform a reselection to the base station apparatus 104. In particular, a transmitter 106 may transmit a PSS, SSS and PBCH, allowing the UE 100 to discover and synchronise with the transmitter 106, and to obtain master information block (MIB) information by decoding the PBCH. The transmitter 106 further transmits system information messages including SIB1, SIB3 and SIB5/6. SIB 1 includes SIB mapping information to enable the UE 100 to determine in which PRBs to find SIB3 and SIB5/6. SIB3 is used to allocate a CellReselectionPriority value to the "cell" generated by the transmitter 106, which for the purposes of the present invention is set to a low value, for example to the minimum value 0. SIB5/6 is used to provide the UE 100 with information about neighbouring cells for inter-frequency reselection (or LTE to WCDMA reselection in the case of SIB6). In this case, the inter-frequency carrier frequency list in SIB5/6 includes the frequency band in which the base station apparatus 104 operates, and allocates a higher CellReselectionPriority to this frequency band than the CellReselectionPriority allocated to the transmitter 106.

Using the above configuration, when a UE 100 detects the transmitter 106, the UE 100 regards the transmitter 106 as a valid cell, but is induced by the system information messages to search in the higher-priority frequency band of the base station apparatus 104, which will cause a reselection to the base station apparatus 104 as required.

In addition to the broadcast control signals and system messages discussed above, the transmitter 106 may optionally transmit other OFDM data in PRBs not used for the broadcast control signals and system information messages, for example random OFDM data to interfere with broadcast control signals transmitted by one or more of the eNodeBs 102. The signal transmitted by the transmitter 106 may for example be configured as shown in any of FIGS. 3-5, with the addition of the SIB1, SIB3, SIB5/6 messages in suitable PRBs within the channel.

The present invention can be applied for any RAT. Although in the illustrative example described above, the functionality of each of the networked base stations is incorporated into an eNodeB 102, it will be appreciated that for other RATs, the functionality of a base station may be performed by other network entities, for example a Next Generation NodeB (gNB) in 5G, a nodeB in 3G, a base station controller (BSC) and base transceiver station (BTS) in GSM.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Apparatus for establishing a wireless connection with a mobile communication device, the apparatus comprising:
a transceiver arranged to transmit a set of broadcast control signals on a first carrier, thereby to enable the establishing of the wireless connection between the transceiver and the mobile communication device; and
one or more transmitters each arranged to transmit a respective interference signal for interfering with broadcast control signals transmitted on a respective one or more carriers different from the first carrier by a respective one or more base stations of a mobile communications network, wherein:

the transceiver is arranged to transmit a further interference signal for interfering with broadcast control signals transmitted on the first carrier by a further base station of the mobile communications network;

the further interference signal comprises data encoded and modulated using orthogonal frequency-division multiplexing and allocated to a set of resource blocks occupying at least a portion of the bandwidth of the first carrier;

said at least portion comprises a control region in which the further base station of the mobile communications network transmits broadcast control signals; and the set of resource blocks does not contain resource blocks in which the transceiver transmits broadcast control signals.

2. The apparatus of claim 1, wherein the interference signal transmitted by at least one of the transmitters comprises data encoded and modulated using orthogonal frequency-division multiplexing and allocated to resource blocks occupying at least a portion of the bandwidth of one of the respective one or more carriers, said at least portion comprising a control region in which one of the respective one or more base stations transmits broadcast control signals.

3. The apparatus of claim 2, wherein said data comprises random or pseudo-random data.

4. The apparatus of claim 2, wherein said data comprises broadcast control signals and system information messages, wherein the system information messages allocate a higher cell reselection priority to the first carrier than to said one of the respective one or more carriers.

5. The apparatus of claim 1, wherein the interference signal transmitted by at least one of the transmitters comprises a continuous wave signal.

6. The apparatus of claim 1, wherein the broadcast control signals transmitted by the transceiver include a primary synchronisation signal (PSS), a secondary synchronisation signal (SSS), and a physical broadcast channel (PBCH).

7. The apparatus of claim 1, comprising one or more further transceivers each arranged to transmit respective further broadcast control signals on a respective carrier different from any of the carriers with which the interference signals interfere, thereby to enable the establishing of the wireless connection with the mobile communication device.

8. The apparatus of claim 7, wherein two or more of the transceivers are arranged to transmit respective downlink signals on a common carrier, to enable establishing of a wireless connection with mobile communications devices in respective different spatial regions.

9. The apparatus of claim 8, wherein each of the two or more transceivers comprises a directional antenna and the different spatial regions are angular sectors.

10. The apparatus of claim 1, wherein at least one of the transmitters is a simplex device.

11. The apparatus of claim 1, arranged to establish the wireless connection in accordance with the long-term evolution, LTE, or long-term evolution advanced, LTE-A, mobile communication standard.

12. The apparatus of claim 1, wherein:
the first carrier is within a first frequency band; and
at least one of the carriers interfered with by the interference signals is in a second frequency band different to the first frequency band.

13. The apparatus of claim 1, arranged to establish the wireless connection using a first radio access technology (RAT),
wherein at least one of the carriers interfered with by the interference signals uses a second RAT different from the first RAT.

14. A method of establishing a wireless connection between a transceiver and a mobile communication device, the method comprising:

transmitting, by a transceiver, a set of broadcast control signals on a first carrier, thereby to enable the establishing of the wireless connection between the transceiver and the mobile communication device;

transmitting, by each of one or more transmitters, a respective interference signal for interfering with broadcast control signals transmitted on a respective one or more carriers different from the first carrier by a respective one or more base stations of a mobile communications network; and transmitting, by the transmitter, a further interference signal for interfering with broadcast control signals transmitted on the first carrier by a further base station of the mobile communications network, wherein:

the further interference signal comprises data encoded and modulated using orthogonal frequency-division multiplexing and allocated to a set of resource blocks occupying at least a portion of the bandwidth of the first carrier;

said at least portion comprises a control region in which the further base station of the mobile communications network transmits broadcast control signals; and the set of resource blocks does not contain resource blocks in which the transceiver transmits broadcast control signals.

15. The method of claim 14, wherein the interference signal transmitted by at least one of the transmitters comprises data encoded and modulated using orthogonal frequency-division multiplexing and allocated to resource blocks occupying at least a portion of the bandwidth of one of the respective one or more carriers, said at least portion comprising a control region in which one of the respective one or more base stations network transmits broadcast control signals.

16. The method of claim 15, wherein said data comprises broadcast control signals and system information messages, wherein the system information messages allocate a higher cell reselection priority to the first carrier than to said one of the respective one or more carriers.

17. The method of claim 14, wherein:
the first carrier is within a first frequency band; and
at least one of the one or more carriers interfered with by the interference signals is in a second frequency band different to the first frequency band.

18. The method of any of claim 14, wherein the establishing of the wireless connection is in accordance with a first radio access technology (RAT),
wherein at least one of the one or more carriers interfered with by the interference signals uses a second RAT different from the first RAT.

* * * * *